United States Patent
Izumi et al.

(10) Patent No.: US 7,727,405 B2
(45) Date of Patent: Jun. 1, 2010

(54) METHOD FOR DEMINERALIZING CONDENSATE

(75) Inventors: Takeshi Izumi, Yokohama (JP); Masahiro Hagiwara, Yokohama (JP)

(73) Assignee: Ebara Corporation, Tokyo (JP)

( * ) Notice: Subject to any disclaimer, the term of this patent is extended or adjusted under 35 U.S.C. 154(b) by 825 days.

(21) Appl. No.: 10/558,273

(22) PCT Filed: May 26, 2004

(86) PCT No.: PCT/JP2004/007163

§ 371 (c)(1),
(2), (4) Date: Nov. 23, 2005

(87) PCT Pub. No.: WO2004/107354

PCT Pub. Date: Dec. 9, 2004

(65) Prior Publication Data

US 2007/0051683 A1    Mar. 8, 2007

(30) Foreign Application Priority Data

May 27, 2003    (JP) .............................. 2003-148565

(51) Int. Cl.
*B01J 47/04* (2006.01)
*B01J 49/00* (2006.01)
*C02F 1/42* (2006.01)

(52) U.S. Cl. ..................... 210/675; 210/686
(58) Field of Classification Search ................ 210/686, 210/675; 376/305, 313
See application file for complete search history.

(56) References Cited

U.S. PATENT DOCUMENTS 3,847,805 A * 11/1974 Voedisch .................... 210/675
4,457,841 A * 7/1984 Emmett ...................... 209/454
6,633,624 B1 * 10/2003 Ito et al. ..................... 376/313

FOREIGN PATENT DOCUMENTS

| JP | 8-224579 | 9/1996 |
| JP | 9-187765 | 7/1997 |
| JP | 2000-46992 | 2/2000 |
| JP | 2001-246377 | 9/2001 |

OTHER PUBLICATIONS

Dowex Marathon MSA Product information, Uniform Particle Size, High Capacity, Macroporous Strong Base Anion Exchange Resin for Water Demineralization Applications, two pages, date unknown.*

(Continued)

*Primary Examiner*—Matthew O Savage
(74) *Attorney, Agent, or Firm*—Wenderoth, Lind & Ponack, L.L.P.

(57) ABSTRACT

The present invention provides methods and equipments for demineralizing condensate, aiming at achieving high-purity effluent quality with a low concentration of sulfate ions derived from organic impurities leaching from cation resins in the condensate treatment by condensate demineralizers in nuclear power plants.

The present invention relates to a condensate demineralizer for demineralizing condensate in a nuclear power plant, comprising a mixed bed of a strongly acidic gel-type cation exchange resin and a uniform particle size strongly basic porous anion exchange resin.

4 Claims, 3 Drawing Sheets

OTHER PUBLICATIONS

P. Chattopadhyay, Boiler Operation Engineering Questions and Answers, published Dec. 2000, McGraw-Hill, second edition, pp. 1225-1239.*

Dow Chemical Company, DOWEX Monosphere 550A (OH) product information, copyright 1995-2000, 2 pages.*

Complete English translation (23 pages) of JP 2001-246377 published Sep. 11, 2001.

Complete English translation (16 pages) of JP 2000-46992 published Feb. 18, 2000.

Complete English translation of Notification of Reason(s) for Rejection issued Feb. 26, 2008 in Japanese Application No. 2003-148565 corresponding to the present U.S. application.

* cited by examiner

METHOD FOR DEMINERALIZING CONDENSATE

TECHNICAL FIELD

The present invention relates to methods and equipments for treating (demineralizing) condensate in nuclear power plants, and provides methods and equipments for demineralizing condensate by which high-purity effluent quality with a low concentration of sulfate ions derived from organic impurities leaching from cation resins can be stably obtained.

BACKGROUND ART

In nuclear power plants, electricity is generated by rotating a turbine with steam generated in a reactor or steam generator, and then the steam is cooled by sea water and the resulting condensed water (condensate) is treated in a condensate demineralizer using an ion exchange resin and recycled to the reactor or steam generator. In the condensate demineralizer, an ion exchange resin is used to remove sea water components flowing into the system or suspended corrosion products based on iron oxides produced from plant construction materials or ionic impurities. The resin used in the condensate demineralizer is a combination of an anion exchange resin and a cation exchange resin (sometimes briefly referred to as "anion resin" and "cation resin", respectively hereinafter), normally a combination of a gel-type cation resin and a gel-type anion resin or a combination of a porous cation resin and a porous anion resin.

Gel-type resins and porous resins have relative disadvantages of low osmotic resistance and low wear resistance, respectively. In view of these disadvantages, gel-type resins are normally used in condensate demineralizers in plants involving frequent backwash regeneration, while porous resins are used in plants involving frequent chemical regeneration. Especially, porous resins are poor in wear resistance so that they suffer from surface damage or breakage of resin particles by contacts between resin particles or between resins and metal materials of piping during transfer between demineralization columns and regeneration columns. For this reason, a gel-type cation resin and a gel-type anion resin with high wear resistance are used in plants involving backwashes to remove suspended corrosion products called clad deposited on cation resin surfaces such as nuclear power plants with boiling water type reactor. In addition, porous resins have a relatively dense resin matrix structure as compared with gel-type resins so that the diffusion speed of ions into pores of the resins during adsorption of the ions and the diffusion speed of ions adsorbed to the resins into washing water during chemical regeneration are lower than those of gel-type resins, resulting in lower performance in kinetics and regeneration efficiency. Thus, condensate demineralizers using porous resins must be designed to increase the regeneration level (the amount of the chemical used) or otherwise allow for characteristics of porous resins.

Ion exchange resins are chemically regenerated at the point when they have been consumed to a certain extent because their ion exchange capacity gradually decreases with the increase of ion load as water passes through them. This step normally comprises separation by upflow backwash taking advantage of the gravity difference between cation resins and anion resins. In order to increase the efficiency of separation by this operation, gel-type ion exchange resins having a uniform particle size distribution are commercially available and widely used in condensate demineralizers.

Ion exchange resins used in condensate demineralizers in nuclear power plants have high capacity to remove ionic components such as sea water components as typified by NaCl coming from upstream, but organic impurities (hereinafter referred to as TOC) leaching from cation resins are carried into the reactor or steam generator where they degrade to produce sulfate ions leading to water quality deterioration. Thus, the leakage of TOC leaching from ion exchange resins must be decreased to achieve high-purity effluent quality.

Methods for solving these problems have been proposed by e.g., adopting a strongly acidic gel-type cation resin having a crosslinking degree of 12-16%, which is higher than conventional degrees of 8-10% (JP-A HEI 11-352283), or adsorbing TOC leaching from cation resins to an anion resin placed in a lower (downstream) resin layer (JP-A 2001-314855), or forming a mixed bed of a strongly acidic gel-type cation resin and a porous anion resin having a Gaussian particle size distribution (JP-A HEI 8-224579).

PROBLEMS TO BE SOLVED BY THE INVENTION

Leaching of TOC or the like can be partly reduced by using a strongly acidic gel-type cation resin having such a high crosslinking degree, but effluent quality deterioration is inevitable even in this case because oxidative degradation advances and leaching of organic impurities gradually increases when the resin is used for a long period. Organic impurities leaching from cation resins can be reduced by placing an anion resin in a lower (downstream) resin layer, but organic impurities leaching from the anion resin leak and degrade to produce nitrate ions or the like, also leading to water quality deterioration. Porous anion resins show a high capacity to adsorb organic impurities because they have macropores, but porous anion resins commonly used in condensate demineralizers in nuclear power plants such as IRA900 available from Organo Co., Ltd. or PA312 available from Mitsubishi Chemical Corporation have a so-called Gaussian particle size distribution in the range of 420-1180 $\mu$m and an average particle size of about 800 $\mu$m as well as macropores characteristic of porous ion exchange resins so that they have a very dense structure in their resin matrix resulting in lower kinetics than that of gel-type resins.

The present invention provides methods and equipments for demineralizing condensate, aiming at achieving high-purity effluent quality with a low concentration of sulfate ions derived from organic impurities leaching from cation resins in the condensate treatment by condensate demineralizers in nuclear power plants.

MEANS FOR SOLVING THE PROBLEMS

As a result of studies of the characteristics of porous resins and gel-type resins as described above, we accomplished the present invention on the basis of the finding that higher effluent quality can be obtained in the condensate demineralization treatment in nuclear power plants by using a combination of a strongly acidic gel-type cation exchange resin and a uniform particle size strongly basic porous anion exchange resin. Accordingly, the present invention provides:

1. A condensate demineralizer for demineralizing condensate in a nuclear power plant, comprising a mixed bed of a strongly acidic gel-type cation exchange resin and a uniform particle size strongly basic porous anion exchange resin;

2. The condensate demineralizer as defined in 1 above wherein the anion exchange resin has an average particle size of 500-1000 μm and a particle size distribution in which 95% or more of resin particles are within the range of the average particle size ±100 μm;

3. A method for demineralizing condensate in a nuclear power plant by using the condensate demineralizer as defined in 1 or 2 above.

By using these equipments and methods, leakage of TOC from demineralizers can be reduced in the condensate demineralization treatment in nuclear power plants, and therefore, the problems described above in nuclear power plants can be solved.

EMBODIMENT OF THE INVENTION

Embodiments of the present invention are explained below, but the present invention is not limited to these embodiments.

Figure 1:
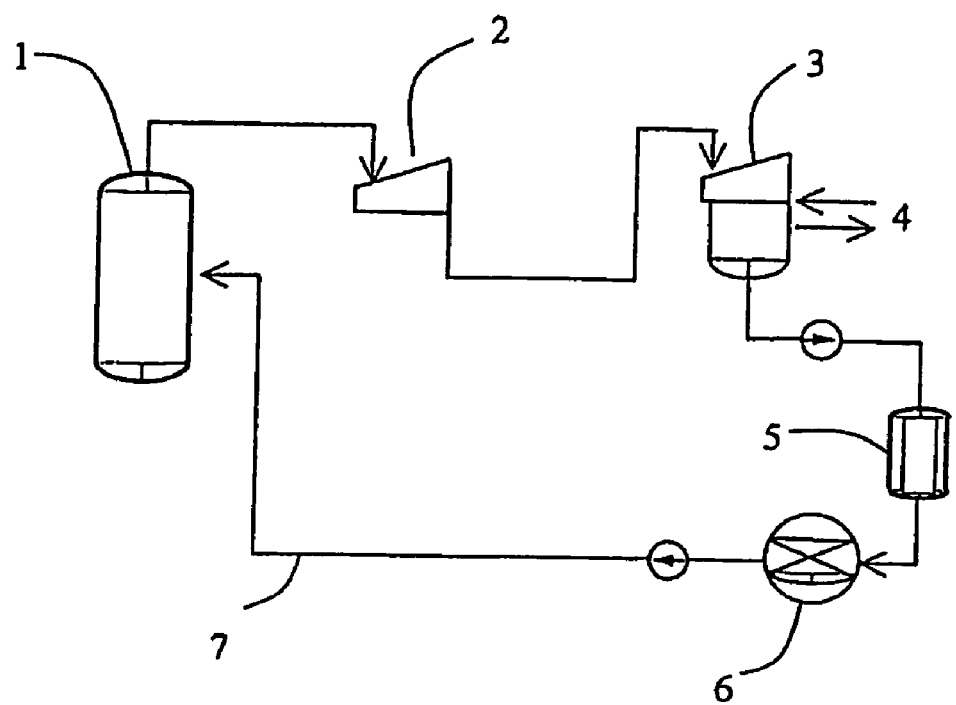
FIG. 1 is a schematic flow diagram of a nuclear power plant with boiling water type reactor (BWR).

FIG. 1 shows a schematic flow diagram of a nuclear power plant with boiling water reactor (BWR) as an example of a nuclear power plant. Steam is generated in an atomic reactor 1 and sent to a steam turbine 2, whereby turbine 2 is rotated to generate electricity. The steam discharged from turbine 2 is sent to a condenser 3 where it is condensed back into water by cooling water 4. The resulting condensate is clarified in a clarification facility comprising a condensate filter 5 and a condensate demineralizer 6 and recycled to reactor 1 via a return line 7. Nuclear power plants with pressurized water type reactor have a similar structure to that of BWR nuclear power plants, i.e. steam is generated in a steam generator and used to rotate a turbine to generate electricity, and then condensed back into water in a condenser and the condensate is clarified in a filter and a condensate demineralizer and recycled to the steam generator.

Figure 2:
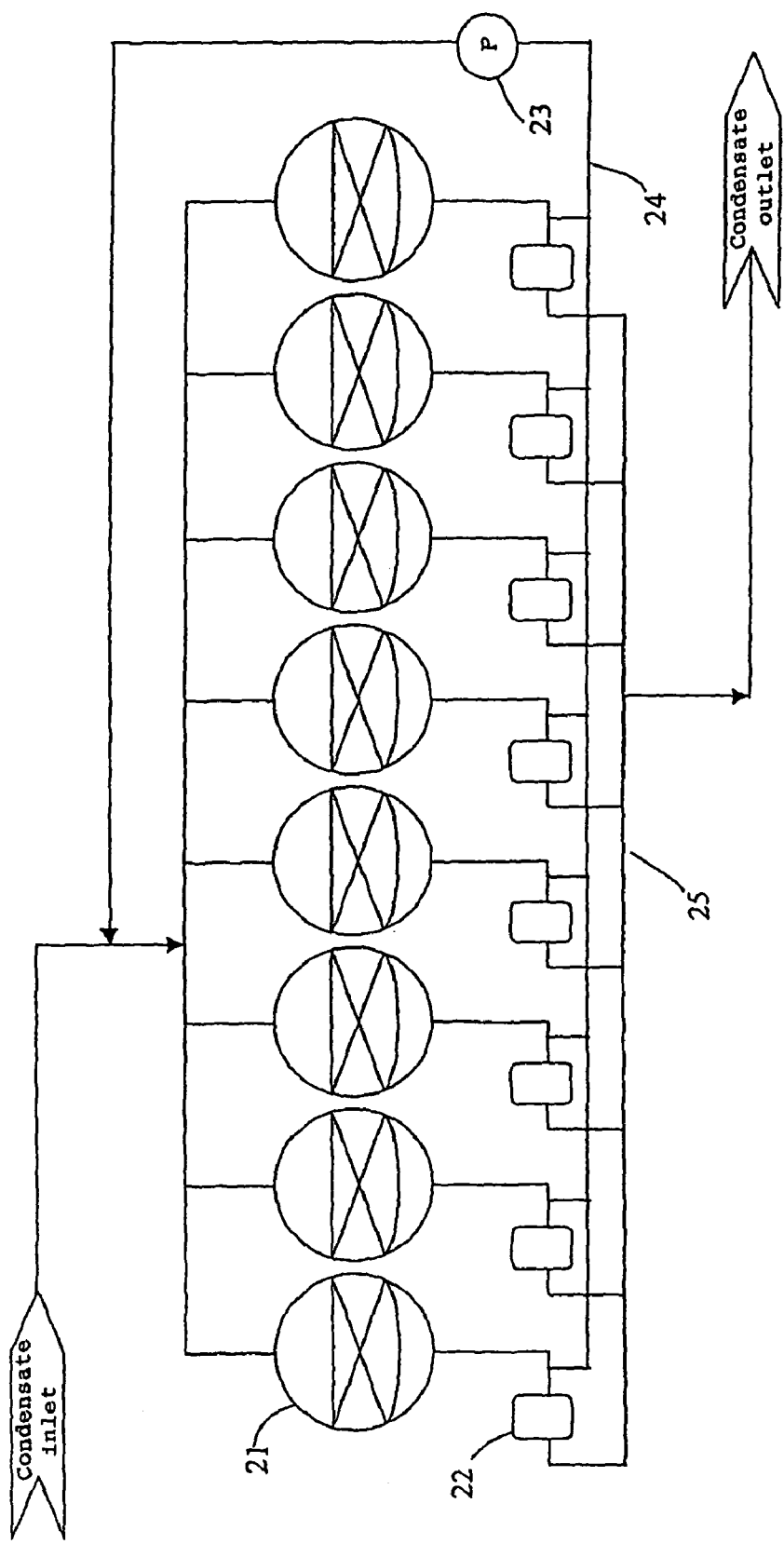
FIG. 2 is a flow diagram showing the structure of a condensate demineralizer.

The condensate demineralizer 6 used in the condensate recycling system as shown in FIG. 1 has a structure as shown in FIG. 2. That is, the condensate demineralizer comprises three to ten ion exchange resin columns 21 and condensate at a flow rate of 2000-7000 m$^3$/h is normally treated in these ion exchange resin columns 21 and a part of effluent is recycled via a return line 24 to ion exchange resin columns 21 while the remainder is discharged via an effluent line 25. In the figure, reference 23 represents a circulating water pump and reference 22 represents a resin strainer for trapping resins if they spill from the resin columns. Each ion exchange resin column 21 is packed with 2000-15000 L of ion exchange resins depending on the throughput to form a mixed bed of cation resin/anion resin in a volume ratio in the range of about 1/2 to 3/1. The resin layer height of the ion exchange rein column is normally in the range of 90-200 cm, typically about 100 cm. The linear flow rate of water passing through the ion exchange resin column is normally in the range of 50-200 m/h, typically about 100 m/h.

The present invention is characterized in that a mixed bed of a strongly acidic gel-type cation exchange resin and a uniform particle size strongly basic porous anion exchange resin is formed in the ion exchange resin columns of the condensate demineralizer as shown in FIG. 2.

Porous anion resins commonly used in condensate demineralizers in known nuclear power plants such as IRA900 available from Organo Co., Ltd. or PA312 available from Mitsubishi Chemical Corporation have a so-called Gaussian particle size distribution in the range of 420-1180 μm and an average particle size of about 800 μm. Further, the porous ion exchange resins have macropores so that they have a very dense structure in their resin matrix resulting in lower kinetics than that of gel-type resins. The particle size of ion exchange resins is one of important factors influencing the kinetics of the resins, and the larger the particle size or the smaller the surface area, the slower the kinetics. The kinetics also becomes slow if the resin matrix is dense because adsorbed ions can not readily diffuse into particles.

In the present invention using a uniform particle size porous anion resin, however, there are few particles having a small particle size of 500 μm or less, and the average particle size can be reduced as compared with ion exchange resins having a Gaussian distribution when a resin layer is formed to provide the same differential pressure. Resins having a so-called Gaussian particle size distribution in the range of 420-1180 μm and an average particle size of 800 μm and uniform particle size resins having an average particle size of 650 μm provide approximately the same differential pressure, which means that the average particle size can be reduced advantageously for kinetics. An additional advantage is that the diffusion distance of adsorbed ions within particles is also decreased.

Strongly basic anion resins are classified into type I and type II according to the type of functional group, among which type I anion resins are mainly used in applications requiring high effluent quality such as condensate demineralizers because type II anion resins have lower ion exchange capacity. Thus, it is preferred that the uniform particle size strongly basic anion resin used in the present invention is also type I.

In view of the low wear resistance of porous resins as described above, some measure should be taken to combine them with gel-type cation resins requiring frequent backwashes. Wear of resins mainly occurs during their transfer or air scrubbing. In the present invention, the disadvantage of the wear resistance of porous anion resins can be avoided by e.g., filling the tank for receiving the resins with water in advance to avoid direct collision of the resins with metal materials during transfer of the resins; or decreasing the slurry concentration during transfer of the resins to reduce wear caused by contacts between the resins; or separating cation and anion resins and subjecting only cation resins having a significant amount of clad deposited on their surfaces to air scrubbing that was conventionally applied to mixed resins.

For the reasons described above, it became possible to solve the problems of kinetics and wear resistance conventionally considered as disadvantages of porous resins and to take advantage of the high capacity of porous resins to adsorb organic impurities by using uniform particle size strongly basic porous anion resins.

Type I strongly basic porous anion resins having a uniform particle size that can be used in the present invention include MP725A available from Dow Chemical Japan Ltd. Porous ion exchange resins commonly available on the commercial market can also be used by adjusting them to a uniform particle size via water-sieving or the like process.

In contrast to ion exchange resins commonly used in known condensate demineralizers that have a so-called Gaussian particle size distribution in the range of 420-1180 μm, it is preferable in the present invention to form a mixed bed of ion exchange resins using a strongly basic porous anion resin having an average particle size of 500-1000 μm, desirably 550-800 μm considering the differential pressure or kinetics during passage of water through the demineralizer and a particle size distribution in which 95% or more of resin particles are within the range of the average particle size ±100 μm. Additionally, strongly acidic gel-type cation resins also preferably have a particle size and particle size distribution comparable to those of anion resins shown above. In conventional ion exchange resins having a Gaussian distribution, only about 50% of resin particles are within the range of the average particle size ±100 μm.

EXAMPLES

The following examples further illustrate the present invention. However, these examples are not intended to limit the present invention.

Example 1

A mixed bed was formed by combining a strongly acidic gel-type cation resin HCR-W2-H (Dow Chemical Japan Ltd.) which is commonly used in conventional condensate demineralizers in nuclear power plants and a type I strongly basic gel-type anion resin having a Gaussian particle size distribution SBR-P-C-OH (Dow Chemical Japan Ltd.) a uniform particle size type I strongly basic porous anion resin MP725A (Dow Chemical Japan Ltd.). Water was passed through the mixed bed to determine the concentration of ions leaking from the resin layers. The water quality, temperature and dissolved oxygen concentration of the influent, and the resin layer height and the linear flow rate of water were similar to those of real plants to simulate their conditions.

A column having an inner diameter of 25 mm was packed with a mixture of the cation resin and anion resin described above in a volume ratio of 2/1 and sufficiently deaerated pure water having a conductivity of 0.006 mS/m and a dissolved oxygen concentration of 20 μg/L at a temperature of 45° C. was passed through the column. The effluent discharged from the column was irradiated with UV rays to degrade TOC contained in the effluent and the concentration of the sulfate ions generated was analyzed by ion chromatography. The results are shown in Table 1. It is apparent from Table 1 that the concentration of sulfate in the effluent obtained by the method of the present invention using a combination of a gel-type cation exchange resin and a uniform particle size type I strongly basic anion exchange resin is lower than that of the conventional method using a combination of a gel-type cation exchange resin and a gel-type anion exchange resin, indicating that the method of the present invention shows better deionization performance

TABLE 1

| | Concentration of sulfate ions in effluent (μg/L) |
|---|---|
| Conventional method | |
| gel-type cation resin + gel-type anion resin | 0.05 |
| The present invention | |
| gel-type cation resin + type I uniform particle size anion resin | 0.02 |

Example 2

A strongly basic type I porous anion resin having a Gaussian particle size distribution MSA (Dow Chemical Japan Ltd.) and a strongly basic type I uniform particle size porous anion resin MP725A (Dow Chemical Japan Ltd.) were tested for their reaction kinetics by the following method.

Figure 3:
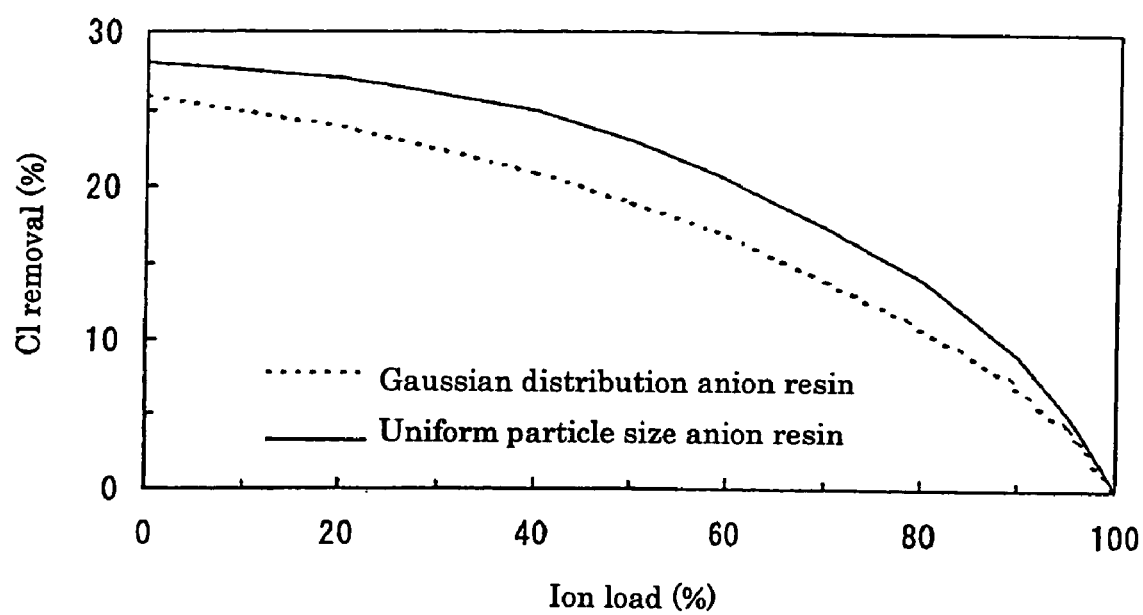
FIG. 3 is a graph showing the experimental results of Example 2.

A column having an inner diameter of 16 cm was packed with 2 mL of each anion resin to form a resin layer height of 1 cm. A chemical solution having an NaCl concentration of 20 mg/L was passed through this column at a linear flow rate of 120 m/h and the concentration of Cl in the effluent was regularly measured to evaluate the Cl removal performance of the anion resin layer. The results were plotted as the relationship between ion load based on the total exchange capacity of the anion resin and demineralization factor(Cl removal rate). The demineralization factor here was calculated by the equation below:

Demineralization factor (%)=100×(inlet concentration−outlet concentration)/outlet concentration The results are shown in FIG. 3. It is apparent from the figure that the uniform particle size anion resin according to the present invention shows a higher demineralization factor than that of the Gaussian distribution anion resin, indicating that the present invention is advantageous in kinetics. From the fact that the reaction kinetics of this uniform particle size porous anion resin is comparable to the reaction kinetics of the Gaussian distribution gel-type resin, it will be understood that the kinetics problem associated with combination with a gel-type cation resin was solved.

INDUSTRIAL APPLICABILITY

According to the present invention, methods and equipments for demineralizing condensate are provided, by which high-purity effluent quality can be obtained in the condensate demineralization treatment in nuclear power plants.

is the invention claimed is:

1. A method for demineralizing condensate in a nuclear power plant by using a condensate demineralizer comprising a mixed bed of a strongly acidic gel-type cation exchange resin and a uniform particle size strongly basic porous anion exchange resin, said method comprising:

passing the condensate through the mixed bed, wherein the mixed bed is regenerated when the ion exchange resins of the mixed bed are consumed to a certain extent, and the regeneration comprises at least one of the following steps (i) and (ii):

(i) separating the cation exchange resin from the anion exchange resin, and subjecting only the cation exchange resin to air scrubbing; and (ii) filling a tank for receiving the resins with water prior to transferring the resins to the tank.

2. The method according to claim 1, wherein the anion exchange resin has an average particle size of 500-1000 μm and a particle size distribution in which 95% or more of resin particles are within the range of the average particle size ±100 μm.

3. A method for regenerating a mixed bed of a strongly acidic gel-type cation exchange resin and a uniform particle size strongly basic porous anion exchange resin, for use in a condensate demineralizer of a nuclear power plant, said method comprising at least one of the following steps (i) and (ii):

(i) separating the cation exchange resin from the anion exchange resin, and subjecting only the cation exchange resin to air scrubbing; and (ii) filling a tank for receiving the resins with water prior to transferring the resins to the tank.

4. The method according to claim 3, wherein the anion exchange resin has an average particle size of 500-1000 μm and a particle size distribution in which 95% or more of resin particles are within the range of the average particle size ±100 μm.

* * * * *